Patented Sept. 8, 1936

2,053,271

UNITED STATES PATENT OFFICE 2,053,271

RUBBER PRODUCTS

Harry Ben Dykstra, Wilmington, Del., assignor to E. I. du Pont de Nemours & Company, Wilmington, Del., a corporation of Delaware No Drawing. Application April 5, 1934, Serial No. 719,148

15 Claims. (Cl. 260—1)

This invention relates to new rubber derivatives and more particularly to new rubber derivatives prepared by the addition of certain active halogen compounds to rubber.

Examples of the simple addition of organic compounds to rubber are relatively rare. Alkyl or aryl sulfur halides, for example, phenyl sulfur chloride have been added to rubber as disclosed in British Patent 313,919 and French Patent 676,287. Holmberg, in volume 65, pages 1349 to 54 of the Berichte der deutschen chemischen Gesellschaft, discloses the addition of thioglycollic acid to rubber without solvent or catalyst. German Patent 557,270 discloses the reaction between rubber and benzyl chloride in carbon tetrachloride with such catalysts as aluminum chloride.

This invention has as an object the preparation of new derivatives of rubber. A further object is the preparation of new substances useful in plastic and adhesive compositions. Further objects will appear hereinafter.

These objects are accomplished by the following invention wherein rubber is reacted with an organic compound such as an alpha halogenated ether or an acid chloride, containing a halogen atom attached to carbon directly attached to an oxygen atom.

In general, in the process of the present invention the rubber in the form of thin strips or other pieces affording a large surface area, is mixed with from 1 to 4 moles of the halide per one mole of isoprene unit of the rubber and allowed to react at temperatures ranging from 20 to 100° C., but preferably at 30° C. for an extended time, on the order of two weeks. The reaction may also be carried out in solution in which event the reaction period is much shorter, especially where a catalyst is used. The reaction is conducted in a reaction vessel from which moisture can be excluded. Illustrative but not limitative examples are given below.

Example 1

Twenty-five grams of rubber in small pieces was covered with 75 grams of chloromethyl ether and allowed to stand at room temperature (25° C.) for 14 days in a closed reaction vessel. At the end of this period the tough spongy mass, having a strong odor of chloromethyl ether, was steam distilled to destroy the unreacted chloroether, dried for 3 hours in vacuo and then for 48 hours in a dessicator containing potassium hydroxide. Chlorine analysis gave an average of 16% chlorine as compared with 24% chlorine for the complete reaction of one mole of rubber (calculated as $C_5H_8$), and one mole of chloromethyl ether. The resulting product was light tan in color, only slightly extensible, and insoluble in the usual rubber solvents such as chloroform and benzene, and likewise insoluble in solvents such as alcohol and acetone.

Example 2

Two hundred and fifty grams of rubber and 880 grams of chloromethyl butyl ether were allowed to stand in contact at room temperature (25° C.) in a closed reaction vessel for 17 days. The reaction mass was then steam distilled and the rubber derivative dried in vacuo. The reaction product contained 7.5% chlorine as compared with a theoretical value of 18.5% chlorine for complete reaction of one mole of chloromethyl butyl ether and one mole of rubber. The product was tan colored, practically non-extensible and insoluble in the usual organic solvents, although some swelling occurred in rubber solvents.

Example 3

Forty-six grams of acetyl chloride and 10 grams of rubber in the form of thin strips were allowed to react in a suitable flask for 3 weeks at 25° C. The excess acid chloride was then destroyed with hot water and the product dried in vacuo. This derivative contained 17.2% chlorine as compared with a theoretical value of 24.2%; was considerably darker in color as compared with the chloroether derivatives and insoluble in rubber or other organic solvents. Here again slight swelling was observed with rubber solvents.

Example 4

Seventeen grams of finely divided rubber, 60 grams of chloromethyl butyl ether, and 0.17 grams of bismuth trichloride, $BiCl_3$, as catalyst were allowed to stand for 19 days at 25° C. to 30° C. The reaction mixture was then treated with successive 200 cc. portions of hot benzene to take out unreacted rubber and excess chloroether, and finally treated with one 250 cc. portion of alcohol. The insoluble product was then dried in a vacuum oven. Analysis for chlorine gave 10.5%.

Example 5

Six grams of chloromethyl ether and 2.5 grams of finely divided rubber were heated for 20 hours at 60° to 90° C. in a sealed tube. After treatment with water and drying, the tan colored, insoluble rubber derivative was obtained.

Example 6

Ninety-two grams of an 18.5% solution of rubber in petroleum ether and 45 grams of chloromethyl butyl ether were gently refluxed at 50° C. for 4 hours and allowed to stand overnight. The rubber derivative was then precipitated from the petroleum ether with acetone, redispersed in benzene and again precipitated with acetone. After drying over night in a vacuum oven the tan colored, insoluble product was obtained.

*Example 7*

To a solution of 50 grams pale crepe (rubber) in 950 grams petroleum ether, 78 grams acetyl chloride and 133 grams aluminum chloride were added with stirring. An exothermic reaction occurred, making it necessary to apply external cooling to keep the temperature below 30° C. The mixture was stirred for four hours at 20° to 30° C. The mass was treated with water and extracted with benzene. On removing the benzene from the extract by vacuum distillation, there was obtained 66 grams of dark-colored, rubber-like resin, containing only 0.19% chlorine. This product was readily soluble in ethyl acetate, butyl acetate, and in aromatic hydrocarbons, yielding solutions of relatively low viscosities. Films cast from these solutions were fast drying, fairly hard, but somewhat brittle. The rubber-acetyl chloride condensation product obtained in this experiment was compatible with meta styrene and with polyhydric alcohol-polybasic acid resins of the oil-modified type. It could also be used in a limited ratio with other resins, and with oils, cellulose derivatives, etc.

In place of the chloromethyl ether and chloromethyl butyl ether given in the foregoing examples, other alpha halogenated ethers such as chloromethyl ethyl ether, di-(chloromethyl)-ether, bromomethyl ethyl ether, alpha chloroethyl ethyl ether, alpha chloroethyl phenyl ether, chloromethyl propyl ether, alpha chloroethyl dodecyl ether, chloromethyl octadecyl ether, chloromethyl cyclohexyl ether, etc. may be used. Propionyl chloride, toluyl chloride, naphthoyl chloride, butyryl chloride, lauric acid chloride, benzoyl chloride, etc., may be substituted for the acetyl chloride given in Examples 3 and 7. Other similar halides such as acetyl bromide or iodide may be used. The reaction of rubber with acid halides gives, in addition to halogen containing rubber derivatives, also substantially halogen-free rubber derivatives which appear to have a ketone structure; similarly, substantially halogen-free products may be obtained from the ether condensation.

As illustrated in the examples, the reaction may be carried out with or without the presence of an inert solvent. Solvents may be any mutual solvents such as petroleum ether, chloroform, carbon tetrachloride, cyclohexane, which will not react with rubber or the chlorine compound. Without an inert solvent for each mole of rubber the experiments included from one to four moles of the chloro compound. However, a large excess of the chloro ether or acid chloride may be used without ill effects and in general, the greater the excess of chloro derivative the more rapid the reaction. Thus, for one mole of rubber and two moles of chloro ether, the reaction after two weeks at room temperature had progressed about half as far as a similar reaction wherein four moles of chloro ether had been used per isoprene unit of the rubber.

The temperature of the reaction may be varied from 20° to 100° C. under ordinary conditions. The limiting temperature at atmospheric pressure is necessarily limited by the boiling point of the chloro derivative or the solvent, if a solvent is used. By the use of a closed reaction vessel capable of withstanding pressure the temperature may be raised considerably above the atmospheric boiling points of any of the components of the reaction mixture without harmful effects and with a considerably increased speed of reaction. The reaction vessel may be fashioned of glass, porcelain, acid resistant metal, enamel-lined metal, etc. Because of the reactivity towards moisture of the active halogen compounds used in the reaction, it is desirable that moisture, and, therefore, air, be excluded. The reaction vessel may thus be sealed for low temperature reactions or may be connected, in the case of high temperature reactions, to a drying train containing any of the well known drying agents, for example, calcium chloride or sulfuric acid.

Certain of the examples disclose the use of catalysts. Catalysts of the Friedel and Crafts type may be used.

Thus, aluminum chloride, ferric chloride, stannic chloride, and bismuth chloride may be used. It is preferred to use bismuth chloride in an amount of about 1% based on the weight of rubber used.

The soft products obtained by incomplete reaction may be used as adhesives for binding rubber to metal, wood, etc., and, together with pigments, plasticizers, fillers, etc., in molding compositions. The harder materials representing a more nearly completed reaction may be cut or machined into useful articles. The inertness of the ether derivatives prepared by the process of Examples 1, 2, 4, 5 and 6 towards all solvents tried, indicates their usefulness as gaskets or as fillers for use where exposure to hot oil or solvent is encountered and as replacements for rubber articles which would be swelled by such exposure. The soluble derivatives prepared with the use of a larger amount of catalyst as in Example 7 may be used with the customary dyes, pigments, fillers, etc., in coating and molding compositions, cements, etc.

The above description and examples are intended to be illustrative only. Any modification of or variation therefrom which conforms to the spirit of the invention is intended to be included within the scope of the claims.

I claim:
1. The process which comprises reacting rubber with a chloromethyl ether.
2. The process which comprises reacting rubber with a chloromethyl ether in an inert solvent.
3. The process which comprises reacting one part rubber with approximately three and one-half parts of chloromethyl butyl ether in the presence of about 0.01 part of bismuth trichloride for about 19 days at 25° to 30° C., and extracting the reaction product with benzene and alcohol to remove unreacted material.
4. The process which comprises reacting rubber with a chloromethyl ether in the presence of bismuth chloride.
5. As new products, reaction products of rubber with an alpha halogenated ether wherein the halogen is of the class consisting of chlorine and bromine and not more than one halogen atom is attached to either of the carbon atoms alpha to the ether oxygen atom.
6. As new products, chloromethyl ether-rubber reaction products.
7. The process which comprises reacting rubber with an alpha halogenated ether of the class consisting of alpha monochlorinated and alpha monobrominated ethers.

8. The process which comprises reacting rubber in the presence of a catalyst with an alpha halogenated ether of the class consisting of alpha monochlorinated and alpha monobrominated ethers.

9. As new products, reaction products of rubber with an alpha halogenated ether of the class consisting of alpha monochlorinated and alpha monobrominated ethers.

10. As new products chloromethyl butyl ether-rubber reaction products.

11. As new products reaction products of rubber with an alpha chlorinated ether wherein not more than one chlorine atom is attached to either of the carbon atoms alpha to the ether oxygen carries one and only one chlorine atom.

12. The process which comprises reacting rubber with an alpha halogenated ether wherein the halogen is of the class consisting of chlorine and bromine and not more than one halogen atom is attached to either of the carbon atoms alpha to the ether oxygen atom.

13. The process which comprises reacting rubber with an alpha halogenated ether wherein the halogen is of the class consisting of chlorine and bromine and not more than one halogen atom is attached to either of the carbon atoms alpha to the ether oxygen atom in the presence of a catalyst.

14. The process which comprises reacting rubber with an alpha halogenated ether wherein the halogen is of the class consisting of chlorine and bromine and not more than one halogen atom is attached to either of the carbon atoms alpha to the ether oxygen atom in the presence of an inert solvent.

15. The process which comprises reacting rubber with an alpha halogenated ether wherein the halogen is of the class consisting of chlorine and bromine and not more than one halogen atom is attached to either of the carbon atoms alpha to the ether oxygen atom in the presence of bismuth chloride.

HARRY BEN DYKSTRA.